(12) United States Patent
Holbrook et al.

(10) Patent No.: US 9,495,114 B2
(45) Date of Patent: Nov. 15, 2016

(54) SYSTEM AND METHOD FOR READING AND WRITING DATA WITH A SHARED MEMORY HASH TABLE

(71) Applicants: Hugh W. Holbrook, Santa Clara, CA (US); Duncan Stuart Ritchie, Bowen Island (CA); Sebastian Sapa, Vancouver (CA)

(72) Inventors: Hugh W. Holbrook, Santa Clara, CA (US); Duncan Stuart Ritchie, Bowen Island (CA); Sebastian Sapa, Vancouver (CA)

(73) Assignee: Arista Networks, Inc., Santa Clara, CA (US)

(*) Notice: Subject to any disclaimer, the term of this patent is extended or adjusted under 35 U.S.C. 154(b) by 161 days.

(21) Appl. No.: 14/270,122

(22) Filed: May 5, 2014

(65) Prior Publication Data

US 2014/0337593 A1 Nov. 13, 2014

Related U.S. Application Data

(60) Provisional application No. 61/822,260, filed on May 10, 2013.

(51) Int. Cl.
  *G06F 17/30* (2006.01)
  *G06F 12/10* (2016.01)
  *G06F 3/06* (2006.01)
  *H04L 12/743* (2013.01)

(52) U.S. Cl.
  CPC ............. *G06F 3/065* (2013.01); *G06F 3/0614* (2013.01); *G06F 3/0638* (2013.01); *G06F 3/0673* (2013.01); *G06F 12/1027* (2013.01); *G06F 17/30097* (2013.01); *H04L 45/7453* (2013.01); *G06F 2003/0691* (2013.01); *G06F 2212/507* (2013.01)

(58) Field of Classification Search
  CPC .................. G06F 17/30097; G06F 17/30168; G06F 17/30171; G06F 17/3023; G06F 12/1027; H04L 45/7453
  See application file for complete search history.

(56) References Cited

U.S. PATENT DOCUMENTS

2002/0087500 A1* 7/2002 Berkowitz et al. .................. G06F 17/30371

OTHER PUBLICATIONS

Sullivan, Mark et al., "Using Write Protected Data Structures to Improve Software Fault Tolerance in Highly Available Database Management Systems", Barcelona, Sep. 1991, XP055141954, retrieved from the Internet: URL: http://www.vidb.org/conf/1991/P171.PDF, Proceedings of the 17th International Conference on Very Large Data Bases, Computer Science Division, Department of Electrical Engineering and Computer Sciences, University of California Berkeley, California, pp. 171-180.

EP Search Report and Written Opinion for Appln No. EP 14 16 7804 mailed Sep. 23, 2014. (9 pages).

* cited by examiner

*Primary Examiner* — Edward Dudek, Jr.

(74) *Attorney, Agent, or Firm* — Blakely, Sokoloff, Taylor & Zafman LLP

(57) ABSTRACT

A method and apparatus of a device that reads and writes data using a shared memory hash table and a lookaside buffer is described. In an exemplary embodiment, a device locates a bucket for the data in a shared memory hash table, where a writer updates the shared memory hash table and a reader that is one of a plurality of readers reads from the shared memory hash table. The device further retrieves an initial value of a version of the bucket. If the initial value of the version is odd, the device copies the data from a lookaside buffer of the writer to a local buffer for the reader, wherein the lookaside buffer stores a copy of the data while the bucket is being modified.

21 Claims, 10 Drawing Sheets

SYSTEM AND METHOD FOR READING AND WRITING DATA WITH A SHARED MEMORY HASH TABLE

RELATED APPLICATIONS

Applicant claims the benefit of priority of prior, provisional application Ser. No. 61/822,260, filed May 10, 2013, the entirety of which is incorporated by reference.

FIELD OF INVENTION

This invention relates generally to data networking, and more particularly, to sharing a hash table in shared memory between a writer that writes data to the shared memory hash table and multiple readers that read the data from the shared memory hash table.

BACKGROUND OF THE INVENTION

A network element can include two different planes that are used to process network traffic, a control plane and a data plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane gathers the configuration data from different sources (e.g., locally stored configuration data, via a command line interface, or other management channel such as Simple Network Management Protocol (SNMP)) and configures the data plane using the configuration data).

In addition, the control plane will store the configuration data in one or more tables. For example, the network element will store the routing information in a routing table that is used by the data plane. The data plane can further include multiple different hardware forwarding engines. Each of these hardware forwarding engines will use the configuration data from these tables by reading the tables in the control plane and updating local copies of the tables for each of the hardware forwarding engines. The control plane includes a writer that writes the configuration data, where multiple readers for the hardware forwarding engines read the data. A problem that can arise is that one of the multiple readers attempts to read data from one of the tables that the writer is currently updating. For example, if a reader reads data that is concurrently being modified by the writer, the reader may read data that is partially updated and, thus, is not valid data that is usable by the reader.

SUMMARY OF THE DESCRIPTION

A method and apparatus of a device that reads and writes data using a shared memory hash table and a lookaside buffer is described. In an exemplary embodiment, a device locates a bucket that stores bucket data in a shared memory hash table, where a writer updates the shared memory hash table and a reader that is one of a plurality of readers reads from the shared memory hash table. The device further retrieves an initial value of a version of the bucket. If the initial value of the version is odd, the device copies the bucket data from a lookaside buffer of the writer to a local buffer for the reader, wherein the lookaside buffer stores a copy of the bucket data while the bucket is being modified.

In another embodiment, the device writes data using a writer of the device by locating a bucket that stores bucket data in a shared memory hash table. The device includes a writer that updates the shared memory hash table and a plurality of readers that read from the shared memory hash table. The device further copies the bucket data to a lookaside buffer, where the bucket data stored in the lookaside buffer can be read by the plurality of readers while the bucket data in the bucket is being modified. In addition, the device increments a version of the bucket in the bucket chain, where the incremented version indicates that the bucket is being modified. The device modifies the bucket data in place and subsequently increments the incremented version of the bucket to indicate the bucket data is not being modified.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
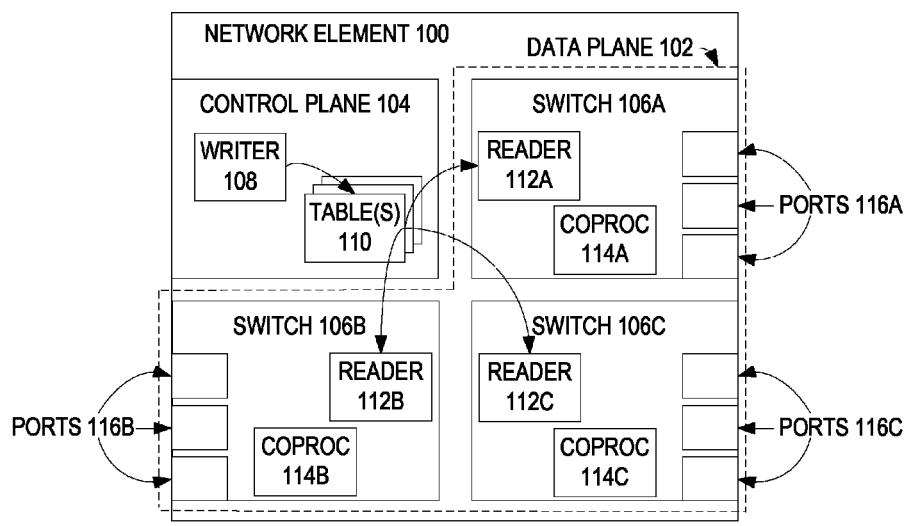
FIG. 1 is a block diagram of one embodiment of a network element that includes one writer updating a set of tables that is being read by multiple readers.

A method and apparatus of a device that reads and writes data using a shared memory hash table and a lookaside buffer is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that reads and writes data using a shared memory hash table and a lookaside buffer is described. In one embodiment, a device includes a writer that writes data to the shared memory hash table and multiple readers that read this data from the shared memory hash table. The shared memory hash table stores data in key-value pairs in buckets that are indexed using the key and a hash function. The writer locates the corresponding bucket in the shared memory hash table using the key. In order to protect against a concurrent read by one of the readers of the data that is being modified by the writer, the writer copies the bucket to a lookaside buffer. The data stored in the bucket is now available via the lookaside buffer to one or more of the readers while the writer modifies data stored in the bucket. To indicate that the data is being modified by the writer, the writer increments a version of the bucket. In one embodiment, an odd valued version indicates to a reader that the bucket data is being modified, whereas an even valued version indicates to the reader that the bucket data is not being modified. In response to the incrementing of the version, the writer modifies the data of the bucket in place, without using locks to lock the data or allocating/releasing memory associated with the bucket. The writer further increments the version of the bucket to indicate that the bucket data is not being modified.

In a further embodiment, the reader uses a key to locate a bucket that stores the data to be read in the shared memory hash table. The reader additionally reads a version of the bucket to determine if the data in the bucket is in the process of being modified. If the version indicates that the data is not being modified, the reader reads the data from the located bucket. If the version indicates that the data is being modified, the reader reads the data from the bucket copy stored in the lookaside buffer. The reader further reads the version of the bucket from the located bucket to determine if the bucket version has changed. If the bucket version has changed, the reader discards the data and starts the read process again. If the bucket version has not changed, the reader uses the retrieved data.

FIG. 1 is a block diagram of one embodiment of a network element 100 that includes one writer updating a set of tables that is being read by multiple readers. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C that can each receives, process, and/or forward network traffic. In one embodiment, each switch 106A-C includes a reader 112A-C, co-processor 114A-C, and ports 116A-C, respectively. In one embodiment, the reader 112A-C reads the data in the tables 110 and stores the data in a local buffer (not illustrated) of the respective switch 106A-C. In this embodiment, each reader 112A-C performs lock-free reads of the data using a lookaside buffer so as to not read data that is in the middle of being updated. Performing a lock-free read of a table is further described in FIGS. 4 and 6 below. In one embodiment, the co-processor 114A-C is a processor for each switch 106A-C that can be used to accelerate various functions of the switch 106A-C. For example and in one embodiment, the co-processor 114A-C can accelerate bulk reads and write from memory in the control plane 104 to the local buffers. In one embodiment, the ports 116A-C are used to receive and transmit network traffic. The ports 116A-C can be the same or different physical media (e.g., copper, optical, wireless and/or another physical media).

In one embodiment, the control plane 104 gathers the configuration data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to one or more tables 110. In one embodiment, the control plane 104 includes a writer 108 that writes configuration data to the table(s) 110 by performing lock-free writes, such that a reader reading the data can read data that is not in the middle of being modified. Performing a lock-free write of a table is further described in FIGS. 4 and 5 below.

Figure 2:
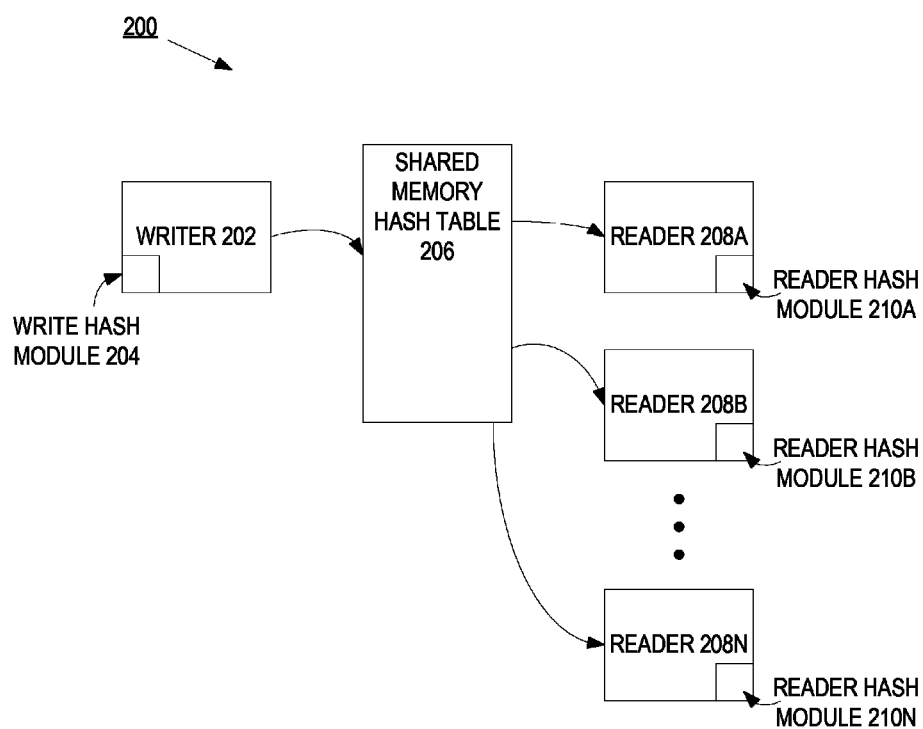
FIG. 2 is a block diagram of one embodiment of a shared memory hash table that is updated by one writer and read by multiple readers.

In one embodiment, each of the one or more tables 110 is a hash table that is shared between the writer 108 and the readers 112A-C. In this embodiment, the table(s) 110 are stored in memory that is shared between the data plane 102 and the control plane 104. FIG. 2 is a block diagram of one embodiment of a shared memory hash table 206 that is updated by one writer 202 and read by multiple readers 208A-N. In one embodiment, the writer 202 writes data to the shared memory hash table 206 using a lock-free write with a lookaside buffer, where each of the data is a key-value pair. The shared memory hash table is a data structure used to implement an associative array of entries, which is a structure that can map the data keys to the data values. A hash table uses a hash function to compute an index into an array of entries, from which the correct value can be stored or retrieved. The shared memory hash table is further described in FIGS. 3 and 4. In one embodiment, the writer 202 includes a writer hash module 204 that performs the lock-free writes of data to the shared memory hash table 206 using the lookaside buffer. In one embodiment, each reader 208A-N includes a reader hash module 210A-N that reads the data from the shared memory hash table 206 using a lookaside buffer. Reading and writing data using the lookaside buffer is further described in FIGS. 4-6 below. As will be apparent to one skilled in the art, the methods and processes described here may be applied to other data structures besides a shared memory hash table, such as a linked list, tree, trie, skip-list, or b-tree. In another embodiment, portions of the present invention may be applicable to other types of data structures that are modified by a writer while simultaneously allowing one or more readers to continue to use the data structure without being affected by the in-progress modifications. For example and in one embodiment, the shared memory hash table 206 is not a hash table, but another type of data structure (e.g., linked list, tree, trie, skip-list, b-tree, or another type of data structure used to store data in memory).

Figure 3:
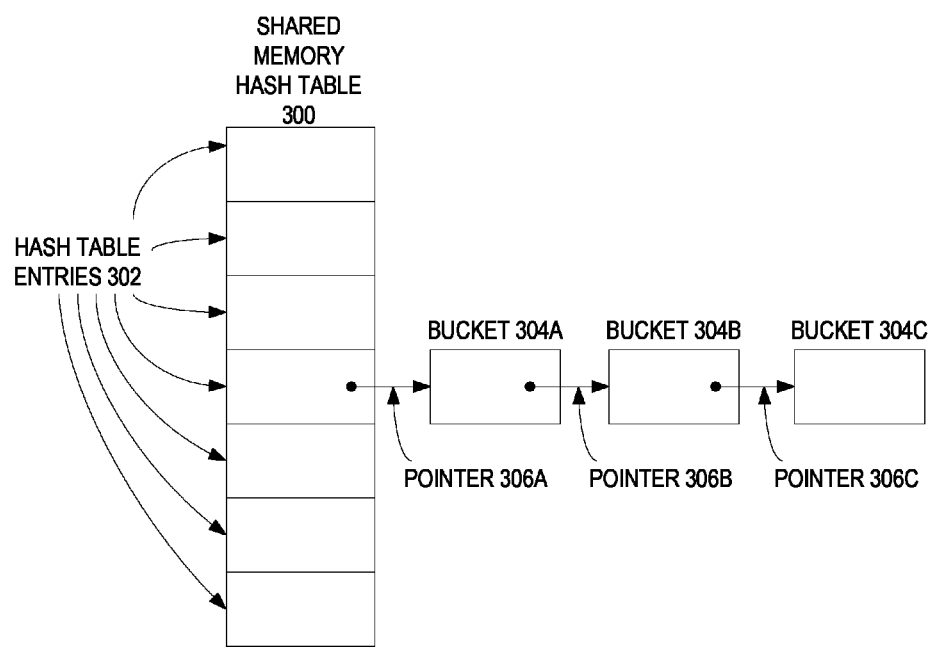
FIG. 3 is a block diagram of one embodiment of a shared memory hash table that includes a chain of buckets.

FIG. 3 is a block diagram of one embodiment of a shared memory hash table 300 that includes a chain of buckets 304A-C. In FIG. 3, the shared memory hash table 300 includes multiple hash table entries 302. For each key-value pair, a hash function is used to compute an index into the shared memory hash table 300 for that key. The index is an identifier as to which hash table entry corresponds to that key. In one embodiment, each hash table entry 302 includes a pointer to a chain of buckets 304A-C, where each bucket 304A-C includes the stored key-value pair. In addition, one table entry 302 includes a pointer 306A to the initial bucket 304A in the chain of buckets 304A-C. Buckets 304A and 304B further include a pointer 306B and 306C, respectively, the point to the next element in the bucket chain 304A-C. For example and in one embodiment, bucket 304A includes a pointer 306B to bucket 304B and bucket 304B includes a pointer 306C to bucket 304C.

Because the shared memory hash table 300 can be concurrently modified by a writer while being read by one or more readers, a mechanism is needed to make sure that a reader reads data that is not in the middle of being modified. If a reader reads data that is concurrently being modified by the writer, the reader may read data that is partially updated and, thus, is not valid data that is usable by the reader. One way to do this is for the writer to lock the bucket, while the writer modified the data stored in that bucket. A lock on a bucket prevents a reader from reading data in that bucket. However, locking the bucket has downsides. For example, if the writer has obtained a lock on a bucket and the process for the writer is switched out so that the processor is not executing the writer process, the bucket is inaccessible to any and all readers while the lock remains on the bucket. Another mechanism to make sure that a reader reads data that is not in the middle of being modified is to create a new bucket when the writer writes the key-value pair. In this mechanism, the writer creates a new bucket for each write and swaps the new bucket into the bucket chain for the old bucket, and then frees the memory for the old bucket. A problem with a swap mechanism is that is that the reader can read the data in the old bucket while the new bucket is being created and populated with the updated data. Thus, using the swap mechanism, a reader cannot be sure if the data being read is an up to date version.

Figure 4:
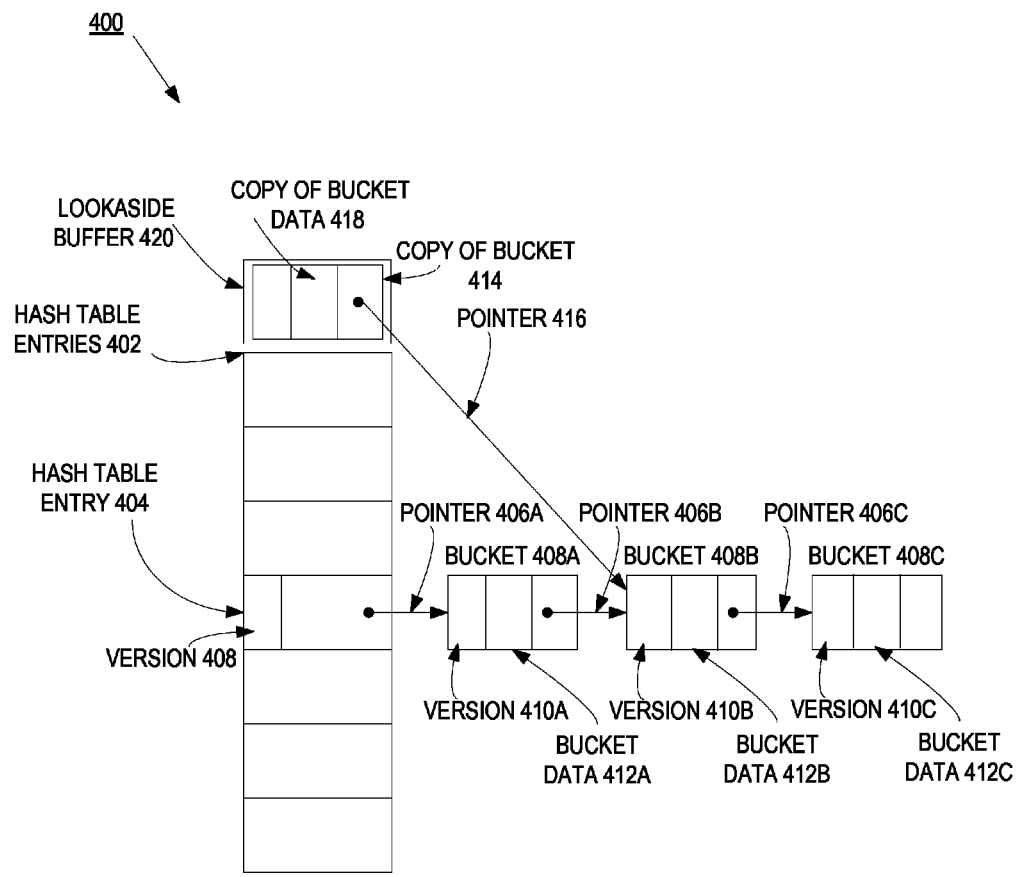
FIG. 4 is a block diagram of one embodiment of a shared memory hash table that includes a chain of buckets and a lookaside buffer.

Instead of using a lock-based or swap-based mechanism, in one embodiment, the shared memory hash table includes a lookaside buffer that is used to temporarily store the contents of a bucket while the writer modifies the bucket data. FIG. 4 is a block diagram of one embodiment of a shared memory hash table 400 that includes a chain of buckets 408A-C and a lookaside buffer 420. Similar to the shared memory hash table illustrated in FIG. 3, in FIG. 4, the shared memory hash table 400 includes multiple hash table entries 402. For each key-value pair, a hash function is used to compute an index into the shared memory hash table 400 for that key. The index is an identifier as to which hash table entry corresponds to the key. In one embodiment, each hash table entry includes a pointer to a chain of buckets 408A-C, where each bucket 408A-C includes the stored key-value pair. In addition, the hash table entry 404 includes a pointer 406A to the initial bucket 408A in the chain of buckets 406A-C. Each bucket 408A-C includes the corresponding key-value pair, and a version 410A-C. In one embodiment, the data for each bucket 408A-C is the key-value pair and the contents of the bucket 408A-C are the version, key-value pair, and pointer to the next element in the bucket chain. Bucket 408A and 406B further include pointers 406B and 406C, respectively, the point to the next element in the bucket chain 408A-C. For example and in one embodiment, bucket 408A includes a pointer 406B to bucket 408B and bucket 408B includes a pointer 406C to bucket 408C.

In one embodiment, the hash table entry 404 further includes a version. In addition, each bucket 408A-C includes a version 410A-C that is used to track whether the data of that bucket are being updated. In one embodiment, before a writer modifies the data in the bucket 408A-C, the writer increments the version of that bucket. In this embodiment, the incremented version indicates to one of the readers that the data in the bucket is being modified. After the writer completes the modification of the bucket data, the writer additionally increments the version to indicate that the bucket data is no longer being modified. For example and in one embodiment, an even version value indicates the bucket data is not being modified and an odd version value indicates that the bucket data is being modified.

In addition and in another embodiment, the hash table 402 further includes a lookaside buffer that is used to store the contents of a bucket while the bucket is being modified. In this embodiment, a writer copies the contents of a bucket before the writer starts to modify that bucket, and before incrementing the version to indicate that the bucket is being modified. A reader can access this copy of the bucket contents, including the key-value pair stored in the bucket, while that bucket is being modified. In one embodiment, the lookaside buffer 420 includes a copy of the bucket 414, in which the bucket copy 414 includes a copy of the bucket data 418 and a pointer 416 to the next element in the bucket chain. Writing and reading bucket data using the lookaside buffer is further described in FIGS. 5 and 6 below.

Figure 5:
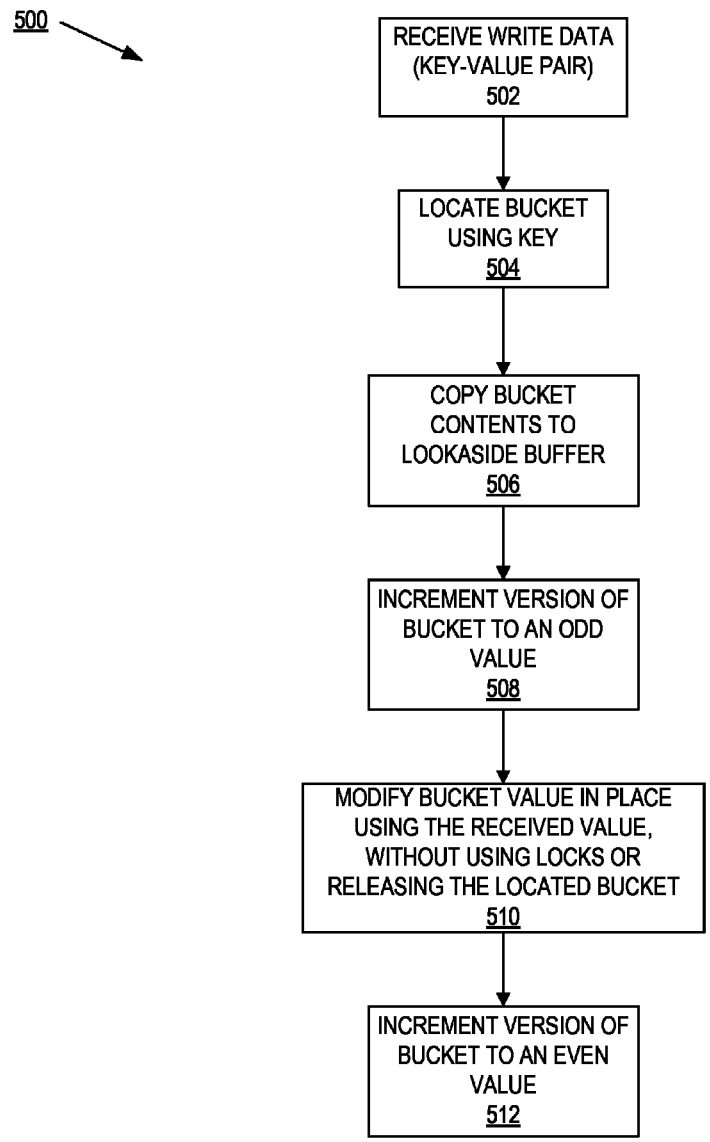
FIG. 5 is a flow diagram of one embodiment of a process to write data to a shared memory hash table using a lookaside buffer without using locks on the data being modified.

As described above, a writer uses the lookaside buffer to temporarily store the bucket contents. FIG. 5 is a flow diagram of one embodiment of a process 500 to write data to a shared memory hash table using a lookaside buffer without using locks on the data being modified. In one embodiment, a writer hash module performs process 500 to write data to a shared memory hash table, such as the writer hash module 204 as described in FIG. 2 above. In FIG. 5, process 500 begins by receiving the write data at block 502. In one embodiment, the write data is a key-value pair, where the key identifies the data that is to be stored and the value is a value associated with the key. For example and in one embodiment, if there is a route to the network NET1 with the network address of 192.168.1.1/24, the write data has a key-value pair of (NET1, 192.168.1.1/24).

At block 504, process 500 locates the bucket for this key-value pair in the shared memory hash table. In one embodiment, process 500 locates the bucket by computing a hash using the hash function for the shared memory hash table and the key. In this embodiment, process 500 uses the resulting hash as an index into the shared memory hash table to locate the corresponding entry for that index. From this entry, process 500 locates the bucket that stores the key by walking the chain of buckets linked to this entry. For example and in one embodiment, if the key is stored in bucket 408A of hash table 402 as illustrated in FIG. 4 above, process 500 would compute the hash using the key and the hash function, where the hash would index to the hash table entry 404. Process 500 walks the chain of buckets to find the matching key stored in bucket 408A.

Process 500 copies the bucket contents to the lookaside buffer at block 506. In one embodiment, process 500 copies the entire data in the bucket (e.g., version, key, value, pointer) to the lookaside buffer. In an alternate embodiment, process 500 copies less than the entire data in the bucket (e.g., value and pointer). In one embodiment, the lookaside buffer is used to hold a copy of the bucket contents while the bucket is being modified. Process 500 increments the version of the bucket at block 508. In one embodiment, process 500 increments the version from an even value to an odd value. In this embodiment, an odd valued version indicates to a reader that the bucket data is being modified, whereas an even valued version indicates to the reader that the bucket data is not being modified.

At block 510, process 500 modifies the bucket value in place. In one embodiment, process 500 modifies the bucket value in place by directly storing the value of the key-value pair in the field of the bucket that holds the value without allocating or releasing the bucket. In addition, by storing a copy of the bucket in the lookaside buffer that is accessible to one or more of the readers and incrementing the version for the bucket, process 500 modifies the bucket value without using locks to lock the data that is being modified. Process 500 increments the bucket version at block 512. In one embodiment, process 500 increments the bucket version from an odd value to an even value. As described above, an even valued version indicates to the reader that the bucket data is not being modified. Process 500 ends at block 512.

Figure 6:
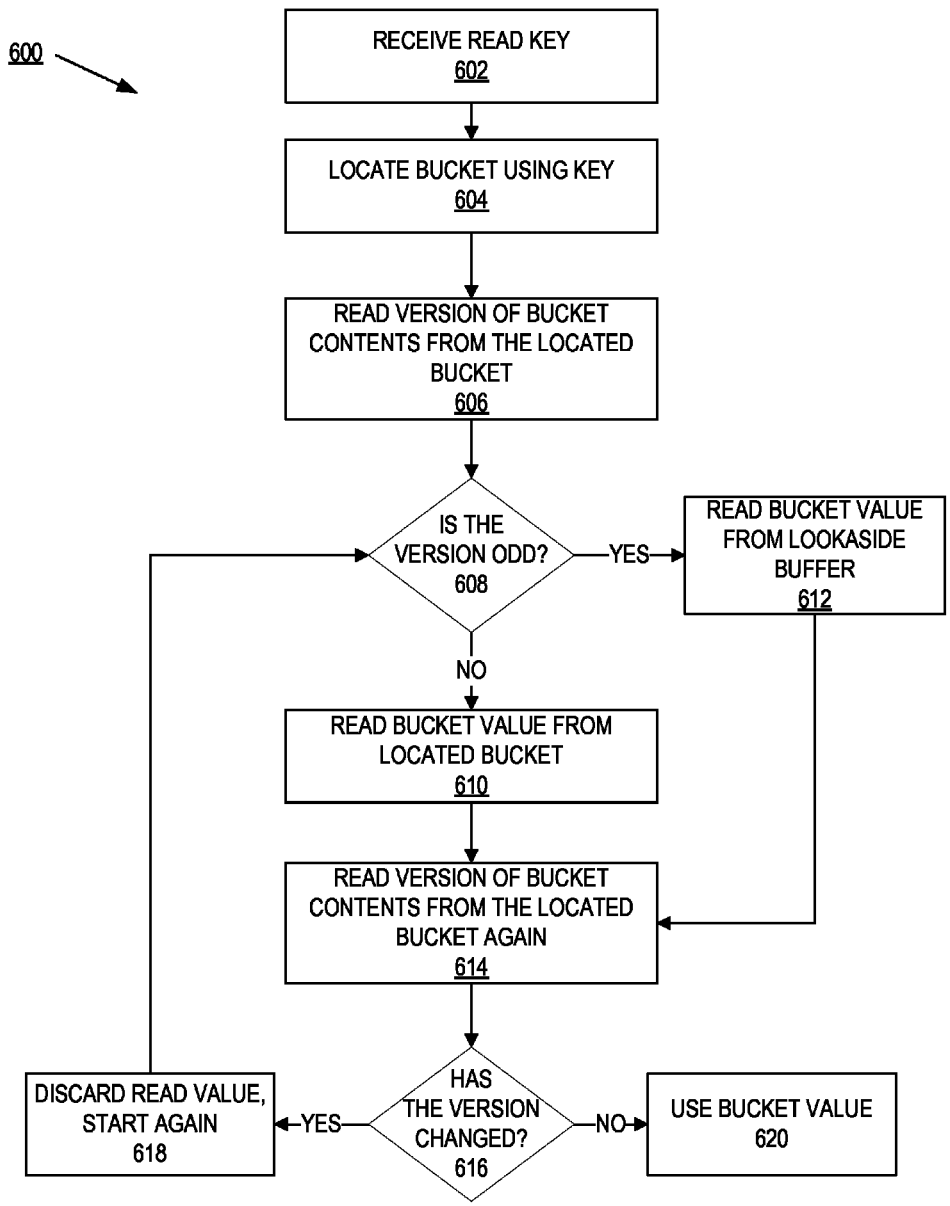
FIG. 6 is a flow diagram of one embodiment of a process to read data from a shared memory hash table using a lookaside buffer.

FIG. 6 is a flow diagram of one embodiment of a process 600 to read data from a shared memory hash table using a lookaside buffer. In one embodiment, a reader hash module performs process 600 to read data from a shared memory hash table, such as the reader hash module 208A-N as described in FIG. 2 above. In FIG. 6, process 600 begins by receiving the key at block 602. In one embodiment, the key identifies the data that is to be read by reading a value associated with the key. For example and in one embodiment, if there is a route to network 192.168.1.0/24 with next hop of ROUTER1, the key is 192.168.1.0/24 for a corresponding value of "ROUTER1".

At block 604, process 600 locates the bucket for this key in the shared memory hash table. In one embodiment, process 600 locates the bucket by computing a hash using the hash function for the shared memory hash table and the key. In this embodiment, process 600 uses the resulting hash as an index into the shared memory hash table to locate the corresponding entry for the index. From this entry, process 600 locates the bucket that stores the key by walking the chain of buckets linked to this entry. For example and in one embodiment, if the key is stored in bucket 408A of hash table 402 as illustrated in FIG. 4 above, process 600 would compute the hash using the key and the hash function, where the hash would index to the hash table entry 404. Process 600 walks the chain of buckets to find the matching key stored in bucket 408A.

Process 600 reads the version of the bucket data from the located bucket at block 606. In one embodiment, the version indicates to process 600 whether the data in the bucket is being modified or not. At block 608, process 600 determines if the version value is odd at block 608. In one embodiment, an odd valued version indicates to a reader that the bucket data is being modified, whereas an even valued version indicates to the reader that the bucket data is not being modified. If the version is odd, process 600 reads the bucket value from the lookaside buffer at block 612. In one embodiment, the bucket value is the value of the key-value pair that is stored in that bucket. For example and in one embodiment, process 600 reads the bucket value from the lookaside buffer 420 as described in FIG. 4 above. Execution proceeds to block 614 below. If the version value is not odd (e.g., even), the bucket data is not being modified, and process 600 reads the value from the bucket at block 610. For example and in one embodiment, process 600 reads the value from the bucket 408A as described in FIG. 4 above.

At block 614, process 600 reads the version of the bucket again. In one embodiment, the subsequent reading of the bucket version is performed after process 600 reads the bucket data from either the bucket or the lookaside buffer. By reading the bucket version a second time, process 600 can determine if the bucket value is valid by determining if the version changed. In one embodiment, if the bucket version changes, the bucket value may not be an up to date or an otherwise valid value. In this case, process 600 starts again and re-reads the value. Process 600 determines if the bucket version has changed from the initial and subsequent readings at block 616. If the bucket version has changed, process 600 discards the value read in at block 610 or 612 and starts again at block 618, and execution proceeds to block 608 above. If the version has not changed, the value read in at block 610 or 612 is a valid value and process 600 uses the bucket value, at block 620.

In FIGS. 5 and 6, these processes used a lookaside buffer for a writer to store a copy of the bucket being modified. In another embodiment, multiple writers can be updating the shared memory hash table, where each writer includes a corresponding lookaside buffer. In this embodiment, each bucket being modified would include a reference to the lookaside buffer that stores the copy of the bucket (e.g., an index for the lookaside buffer, a pointer, or some other reference). If the version of the bucket indicates that the bucket is being modified, the reader would read the reference to determine which lookaside buffer is storing the copy of bucket. With the reference, the reader can read the bucket value stored in the corresponding bucket value. In another embodiment, multiple writers can share the same lookaside buffer by using other synchronization mechanisms to ensure that two writers do not simultaneously choose the same lookaside buffer. For example and in one embodiment, a lock per buffer, used only by the writers, could be used to ensure this. In this embodiment, this may be a reasonable choice if simultaneous writes by two different writers are infrequent.

Figure 7:
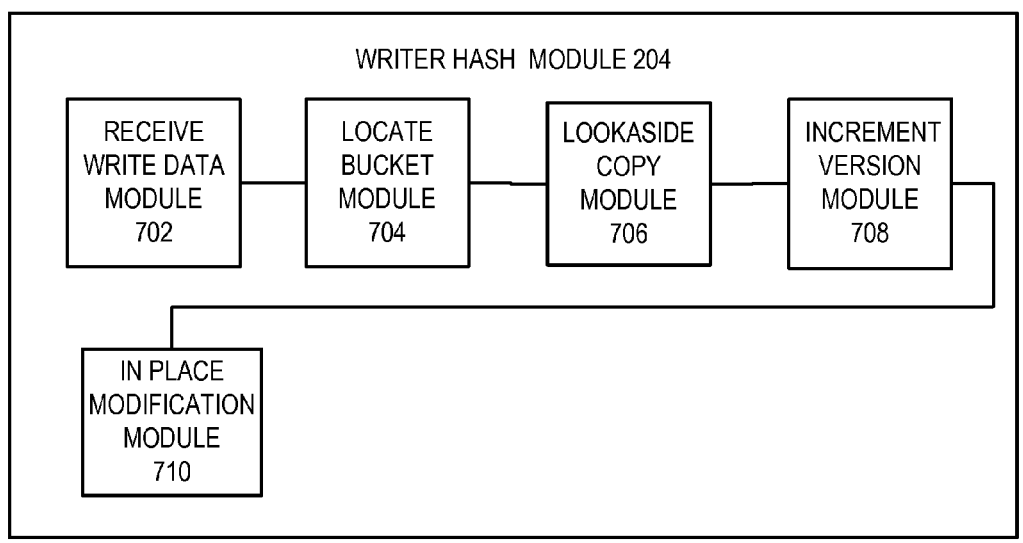
FIG. 7 is a block diagram of a writer hash module that writes data to a shared memory hash table using a lookaside buffer without using locks on the data being modified.

FIG. 7 is a block diagram of a writer hash module 204 that writes data to a shared memory hash table using a lookaside buffer without using locks on the data being modified. In one embodiment, the writer hash module 204 includes a receive write data module 702, locate bucket module 704, lookaside copy module 706, increment version module 708, and in place modification module 710. In one embodiment, the receive write data module 702 receives the write data as described in FIG. 5 at block 502 above. The locate bucket module 704 locates the bucket for the key as described in FIG. 5 at block 504 above. The lookaside copy module 706 copies the bucket to the lookaside buffer as described in FIG. 5 at block 506 above. The increment version module 708 increments the bucket version as described in FIG. 5 at blocks 508 and 512 above. The in place modification module 710 modifies the bucket value in place as described in FIG. 5 at block 510 above.

Figure 8:
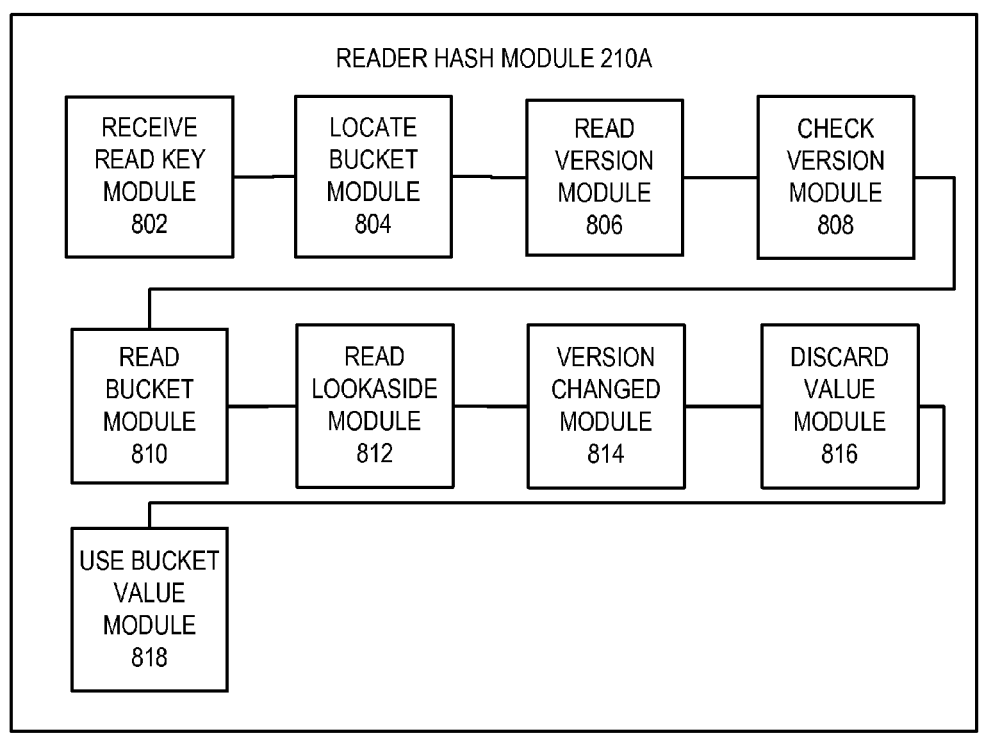
FIG. 8 is a block diagram of a reader hash module that reads data from a shared memory hash table using a lookaside buffer.

FIG. 8 is a block diagram of a reader hash module 210A that reads data from a shared memory hash table using a lookaside buffer. In one embodiment, the reader hash module 210A includes receive read key module 802, locate bucket module 804, read version module 806, check version module 808, read bucket module 810, read lookaside module 812, version changed module 814, discard value module 816, and use bucket value module 818. In one embodiment, the receive read key module 802 receives the read key as described in FIG. 6 at block 602 above. The locate bucket module 804 locates the bucket as described in FIG. 6 at block 604 above. The read version module 806 reads the version of the bucket as described in FIG. 6 at blocks 606 and 614 above. The check version module 808 checks the version of the bucket as described in FIG. 6 at block 608 above. The read bucket module 810 reads the bucket value from the bucket as described in FIG. 6 at block 610 above. The read lookaside module 812 reads the bucket value from the lookaside buffer as described in FIG. 6 at block 612 above. The version changed module 814 determines if the bucket version has changed as described in FIG. 6 at block 616 above. The discard value module 816 discards the bucket value as described in FIG. 6 at block 618 above. The use bucket value module 818 uses the bucket value as described in FIG. 6 at block 620 above.

Figure 9:
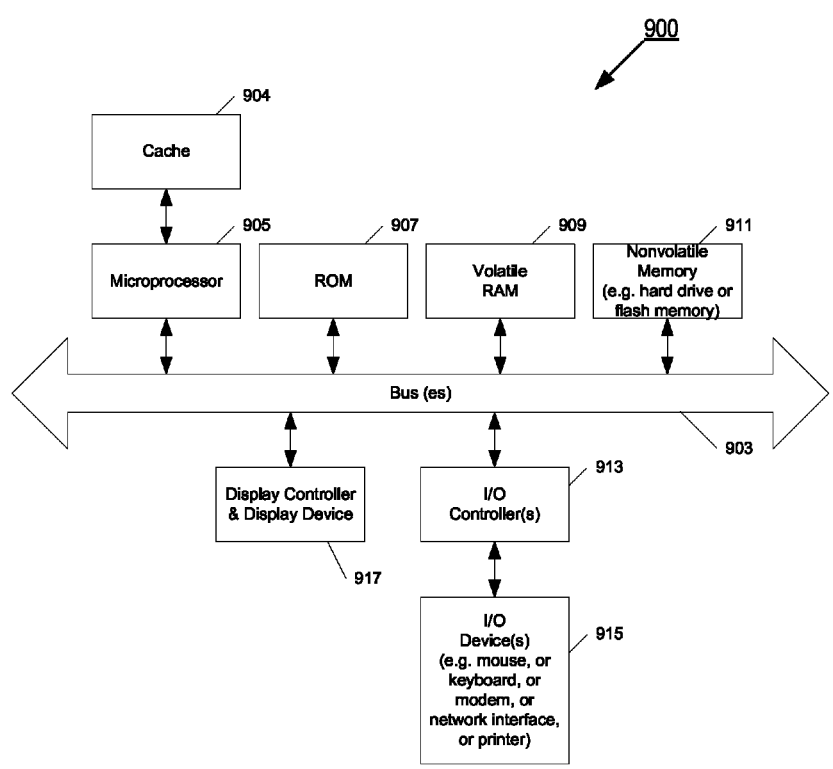
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a network element 100 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
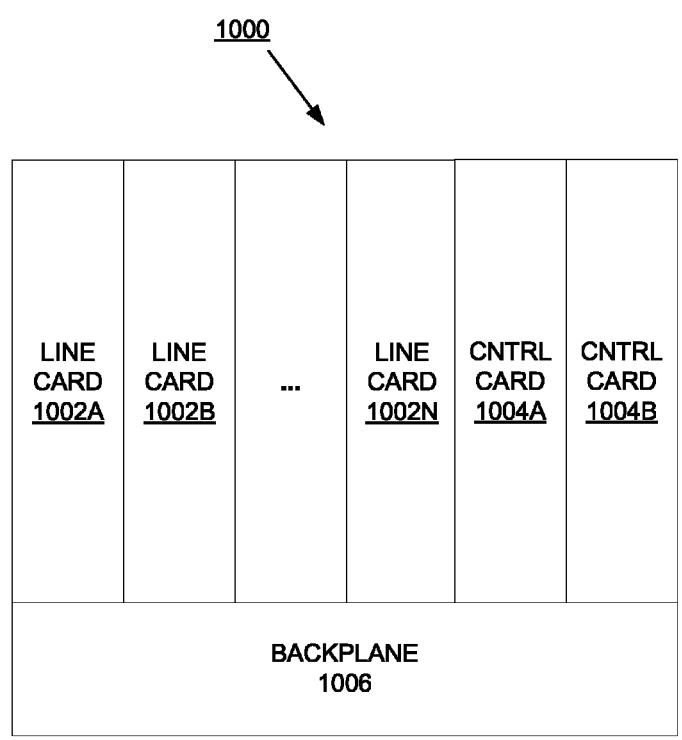
FIG. 10 is a block diagram of one embodiment of an exemplary network element that reads and writes data using a shared memory hash table and a lookaside buffer.

FIG. 10 is a block diagram of one embodiment of an exemplary network element 1000 that reads and writes data with a shared memory hash table using a lookaside buffer. In FIG. 10, the backplane 1006 couples to the line cards 1002A-N and controller cards 1004A-B. While in one embodiment, the controller cards 1004A-B control the processing of the traffic by the line cards 1002A-N, in alternate embodiments, the controller cards 1004A-B, perform the same and/or different functions (e.g., writing data with a shared memory hash table using a lookaside buffer, etc.). In one embodiment, the line cards 1002A-N process and forward traffic according to the network policies received from the controller cards 1004A-B. In one embodiment, the controller cards 1004A-B write data to the shared memory hash table using the lookaside buffer as described in FIG. 5. In this embodiment, one or both of the controller cards include a writer hash module to write data to the shared memory hash table using the lookaside buffer, such as the writer hash module 204 as described in FIG. 2 above. In another embodiment, the line cards 1002A-N read data from the shared memory hash table using the lookaside buffer as described in FIG. 6. In this embodiment, one or more of the line cards 1002A-N include the reader hash module to read data from the shared memory hash table using the lookaside buffer, such as the reader hash module 210A-N as described in FIG. 2 above. It should be understood that the architecture of the network element 1000 illustrated in FIG. 10 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "locating," "determining," "copying," "reading," "discarding," "incrementing," "modifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to read data for a local buffer of a reader of a network element, the method comprising:
   locating a bucket for the data in a shared memory hash table, wherein a writer updates the data in-place in the bucket in the shared memory hash table and the reader is one of a plurality of readers that reads from the shared memory hash table;
   retrieving an initial value of a version of the bucket;
   if the initial value of the version indicates that the data is being modified,
      copying the data from a lookaside buffer to the local buffer for the shared memory hash table, wherein the lookaside buffer stores a copy of the data of the bucket while the bucket is being modified and is accessible by the plurality of readers.

2. The non-transitory machine-readable medium of claim 1, wherein the bucket data is a key-value pair.

3. The non-transitory machine-readable medium of claim 1, further comprising:
   if the initial value of the version is indicates that the data is not being modified,
      copying the data from the bucket to the local buffer, wherein an even value of the version indicates that the writer is not modifying the data in the bucket.

4. The non-transitory machine-readable medium of claim 1, further comprising:
   reading a subsequent value of the version of the bucket.

5. The non-transitory machine-readable medium of claim 4, wherein, if the initial value and the subsequent value of the version are different,
   discarding the data in the local buffer.

6. The non-transitory machine-readable medium of claim 1, wherein an odd value of the version indicates the data in the bucket is being modified by the writer.

7. A non-transitory machine-readable medium having executable instructions to cause one or more processing units to perform a method to write data by a writer of a network element, the method comprising:

locating a bucket that stores bucket data in a shared memory hash table, wherein the writer modifies the shared memory hash table and a plurality of readers that read from the shared memory hash table, and the bucket is an element of a bucket chain;

copying the bucket data to a lookaside buffer, wherein the bucket data stored in the lookaside buffer can be read by the plurality of readers while the bucket data in the bucket is being modified;

incrementing a version of the bucket in the bucket chain, wherein the incremented version indicates that the bucket is being modified;

modifying the bucket data in place; and subsequently incrementing the incremented version of the bucket to indicate the bucket data is not being modified.

8. The non-transitory machine-readable medium of claim 7, wherein the bucket data is a key-value pair.

9. The non-transitory machine-readable medium of claim 7, wherein the incremented version is an odd value.

10. The non-transitory machine-readable medium of claim 7, wherein the subsequently incremented version is an even value.

11. The non-transitory machine-readable medium of claim 7, wherein the modifying the bucket data further comprises:

modifying the bucket data without allocating a new bucket to store the bucket data.

12. The non-transitory machine-readable medium of claim 7, wherein the modifying the bucket data further comprises:

modifying the bucket data without using a lock to lock the bucket data being modified.

13. A method to read data for a local buffer of a reader of a network element, the method comprising:

locating a bucket for the data in a shared memory hash table, wherein a writer updates the data in-place in the bucket in the shared memory hash table and the reader is one of a plurality of readers that reads from the shared memory hash table;

retrieving an initial value of a version of the bucket;

if the initial value of the version indicates that the data is not being modified, copying the data from a lookaside buffer to the local buffer for the shared memory hash table, wherein the lookaside buffer stores a copy of the data of the bucket while the bucket is being modified and is accessible by the plurality of readers.

14. The method of claim 13, wherein the bucket data is a key-value pair.

15. The method of claim 13, further comprising:

if the initial value of the version is indicates that the data is not being modified, copying the data from the bucket to the local buffer, wherein an even value of the version indicates that the writer is not modifying the data in the bucket.

16. The method of claim 13, further comprising:

reading a subsequent value of the version of the bucket.

17. The method of claim 16, wherein, if the initial value and the subsequent value of the version are different, discarding the data in the local buffer.

18. The method of claim 13, wherein an odd value of the version indicates the data in the bucket is being modified by the writer.

19. A network element to read data for a local buffer of a reader of the network element, the network element comprising:

a processor;

a memory coupled to the processor through a bus; and a process executed from the memory by the processor to cause the processor to locate a bucket for the data in a shared memory hash table, wherein a writer updates the data in-place in the bucket in the shared memory hash table and the reader is one of a plurality of readers that reads from the shared memory hash table, retrieve an initial value of a version of the bucket, and, if the initial value of the version indicates that the data is being modified, copy the data from a lookaside buffer to the local buffer for the shared memory hash table, wherein the lookaside buffer stores a copy of the data of the bucket while the bucket is being modified and is accessible by the plurality of readers.

20. The network element of claim 19, wherein the process further causes the processor to if the initial value of the version is indicates that the data is not being modified, copy the data from the bucket to the local buffer, wherein an even value of the version indicates that the writer is not modifying the data in the bucket.

21. A method to write data by a writer of a network element, the method comprising:

locating a bucket that stores bucket data in a shared memory hash table, wherein the writer modifies the shared memory hash table and a plurality of readers that read from the shared memory hash table, and the bucket is an element of a bucket chain;

copying the bucket data to a lookaside buffer, wherein the bucket data stored in the lookaside buffer can be read by the plurality of readers while the bucket data in the bucket is being modified;

incrementing a version of the bucket in the bucket chain, wherein the incremented version indicates that the bucket is being modified;

modifying the bucket data in place; and subsequently incrementing the incremented version of the bucket to indicate the bucket data is not being modified.

* * * * *